(12) United States Patent
Shen et al.

(10) Patent No.: US 9,777,524 B2
(45) Date of Patent: Oct. 3, 2017

(54) HINGE MECHANISM FOR PIVOTING A CASING AND A STAND AND AN ELECTRONIC DEVICE THEREWITH

(71) Applicant: ACER INCORPORATED, New Taipei (TW)

(72) Inventors: Chao-Di Shen, New Taipei (TW); Yan-Lin Kuo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/289,971

(22) Filed: Oct. 11, 2016

(65) Prior Publication Data

US 2017/0218674 A1    Aug. 3, 2017

(30) Foreign Application Priority Data

Jan. 30, 2016    (TW) .............................. 105201507 U (51) Int. Cl.

| E05F 1/08 | (2006.01) |
|---|---|
| E05D 11/10 | (2006.01) |
| E05F 1/12 | (2006.01) |
| F16M 11/38 | (2006.01) |
| G06F 1/16 | (2006.01) |

(52) U.S. Cl.
CPC ........... *E05F 1/1207* (2013.01); *F16M 11/38* (2013.01); *G06F 1/1681* (2013.01); *E05Y 2900/606* (2013.01); *G06F 1/1626* (2013.01)

(58) Field of Classification Search
CPC ......... Y10T 16/5387; Y10T 16/540255; Y10T 16/5398; E05F 1/1207; E05F 1/1223; E05Y 2900/606; F16M 11/38; E06F 1/1626; E06F 1/1681
See application file for complete search history.

(56) References Cited

U.S. PATENT DOCUMENTS

| 5,682,644 A * | 11/1997 | Bohacik .................. E05F 1/061 16/284 |
|---|---|---|
| 6,284,407 B1 * | 9/2001 | Murray ............... H01M 2/1022 429/100 |
| 7,187,539 B2 * | 3/2007 | Kim ...................... G06F 1/1616 16/319 |
| 7,219,393 B2 * | 5/2007 | Kida ...................... G06F 1/1616 16/221 |

(Continued)

*Primary Examiner* — Chuck Mah
(74) *Attorney, Agent, or Firm* — Winston Hsu (57) ABSTRACT

A hinge mechanism includes a base, a resilient mechanism, a rotating shaft, a first cam member and a second cam member. The resilient mechanism is movably disposed on the base. The rotating shaft is rotably disposed through the base. The first cam member abuts against the resilient mechanism and is able to slide along the rotating shaft. The first cam member is able to move with the rotating shaft. The second cam member is mounted on the base and engages with the first cam member. The first cam cooperates with the second cam member during rotation with the rotating shaft, resulting in displacement between the first cam member and the second cam member for forcing the resilient mechanism to deform and generates a resilient recovery force. The resilient recovery force recovers the first cam member and the second cam member.

8 Claims, 7 Drawing Sheets

(56) References Cited

U.S. PATENT DOCUMENTS

| | | | | |
|---|---|---|---|---|
| 7,536,751 B2* | 5/2009 | Kim | G06F 1/1626 | 16/297 |
| 7,738,930 B2* | 6/2010 | Petrella | H04M 1/022 | 16/221 |
| 7,823,307 B2* | 11/2010 | Gibbs | G09F 11/02 | 16/312 |
| 7,936,559 B2* | 5/2011 | Chen | G06F 1/1618 | 16/303 |
| 8,243,432 B2* | 8/2012 | Duan | H04M 1/04 | 248/188.8 |
| 8,646,152 B2* | 2/2014 | Lin | E05D 3/04 | 16/330 |
| 2004/0093690 A1* | 5/2004 | Lu | G06F 1/1616 | 16/330 |
| 2005/0044665 A1* | 3/2005 | Kuramochi | G06F 1/1616 | 16/341 |
| 2005/0155183 A1* | 7/2005 | Lu | A47K 3/38 | 16/340 |
| 2006/0070211 A1* | 4/2006 | Luo | H04M 1/0216 | 16/303 |
| 2007/0094842 A1* | 5/2007 | Chang | G06F 1/1616 | 16/330 |
| 2010/0154170 A1* | 6/2010 | Chen | G06F 1/1681 | 16/303 |
| 2010/0291978 A1* | 11/2010 | Kim | H04M 1/0216 | 455/575.1 |
| 2011/0047751 A1* | 3/2011 | Chen | G06F 1/1681 | 16/303 |
| 2011/0099756 A1* | 5/2011 | Chen | G06F 1/1618 | 16/297 |
| 2014/0215762 A1* | 8/2014 | Mitchell | E05D 7/0423 | 16/374 |
| 2016/0034004 A1* | 2/2016 | Park | G06F 1/1681 | 16/330 |
| 2016/0083993 A1* | 3/2016 | Grewe | E05F 1/1223 | 16/291 |

* cited by examiner

HINGE MECHANISM FOR PIVOTING A CASING AND A STAND AND AN ELECTRONIC DEVICE THEREWITH

BACKGROUND OF THE INVENTION

1. Field of the Invention

The present invention relates to a hinge mechanism and an electronic device therewith, and more particularly, to a hinge mechanism with ability to retract a stand to a casing and an electronic device therewith.

2. Description of the Prior Art

Recently, a tablet computer has been widely implemented in people's daily life. Generally speaking, a casing of the tablet computer is equipped with a stand, and the stand is able to expand with respect to the casing, so that the tablet computer stands on a desktop or an angle between the tablet computer and the desktop is adjustable according to a user's preference, so as to provide the user with fun as using the tablet computer. However, when the tablet computer is desired to be contained, it requires the user to manually retract the stand to the casing, which results in inconvenience in use.

SUMMARY OF THE INVENTION

The present invention provides a hinge mechanism with ability to retract a stand to a casing and an electronic device therewith for solving above drawbacks.

According to an embodiment of the present invention, a hinge mechanism for pivoting a casing with a stand includes a base, a resilient mechanism, a rotating shaft, a first cam member and a second cam member. The base is mounted on the casing. The resilient mechanism is movably disposed on the base. The rotating shaft is rotably disposed through the base. The rotating shaft has a longitudinal axis, a connecting end and an engaging portion. The connecting end is connected to the stand, so that the rotating shaft rotates relative to the base along with the stand. The first cam member abuts against the resilient mechanism and is slidable along the longitudinal axis. The first cam member engages with the engaging portion, so that the first cam member rotates with the rotating shaft. The second cam member is mounted on the base and cam-cooperated with the first cam member. The first cam member cooperates with the second cam member when the first cam member rotates with the rotating shaft, so that the first cam member displaces along the longitudinal axis relative to the second cam member for deforming the resilient mechanism.

According to another embodiment of the present invention, the resilient mechanism includes a moving frame, at least one fixing member and at least one resilient member. The moving frame is movably disposed on the base. The at least one fixing member is installed on the base. The at least one resilient member abuts against the at least one fixing member and the moving frame. The first cam member drives the moving frame to move in a compression direction when the first cam member displaces along the longitudinal axis relative to the second cam member, so that the moving frame compresses the at least one resilient member cooperatively with the at least one fixing member.

According to another embodiment of the present invention, an amount of the at least one fixing member is two, an amount of the at least one resilient member is two, the two resilient members are respectively a spring, and each of the two springs corresponds to one of the fixing members.

According to another embodiment of the present invention, the two springs are symmetric with each other and about the rotating shaft.

According to another embodiment of the present invention, the resilient mechanism further includes at least one assembly member having an assembly body, a first fixing end and a second fixing end. The first fixing end is mounted on the base. The at least one fixing member is mounted with the second fixing end. The at least one resilient member sheathes the assembly body.

According to another embodiment of the present invention, the rotating shaft further has a secure end opposite to the connecting end, and the moving frame includes a frame body, at least one lug portion and a constraining member. The frame body abuts against the first cam member. The at least one lug portion protrudes from the frame body and abuts against an end of the at least one resilient member. The constraining member is mounted with the secure end, and the constraining member is spaced from the frame body of the moving frame.

According to another embodiment of the present invention, at least one engaging hole is formed on the base. The second cam member has at least one engaging post. The at least one engaging post engages with the at least one engaging hole.

According to another embodiment of the present invention, the resilient mechanism is a resilient frame, and the resilient frame includes a flexibly abutting portion and a spring arm portion. The flexibly abutting portion abuts against the first cam member. The spring arm portion extends from the flexibly abutting portion and is connected to the base. The first cam member forces the flexibly abutting portion and the spring arm portion to deform when the first cam member displaces relative to the second cam member along the longitudinal axis.

According to another embodiment of the present invention, the first cam member has at least one first cam surface, and the second cam member has at least one second cam surface. The at least one second cam surface corresponds to the at least one first cam surface, and the at least one first cam surface slides relative to the at least one second cam surface when the first cam member rotates with the rotating shaft, so that the first cam member moves along the longitudinal axis relative to the second cam member.

According to another embodiment of the present invention, the first cam member has a cooperating hole, and the cooperating hole engages with the engaging portion.

In summary, the present invention utilizes the first cam member to cooperate with the second cam member when the first cam member rotates with the rotating shaft, so that the first cam member displaces relative to the second cam member for forcing the resilient mechanism to generate a resiliently recovery force. The resiliently recovery force recovers the first cam member and the second cam member. Accordingly, when the electronic device is desired to be contained, the resiliently recovery force generated by the resilient mechanism is able to retract the stand to the casing, and it does not require the user to manually retract the stand to the casing, so as to enhance convenience of the electronic device in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention maybe practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
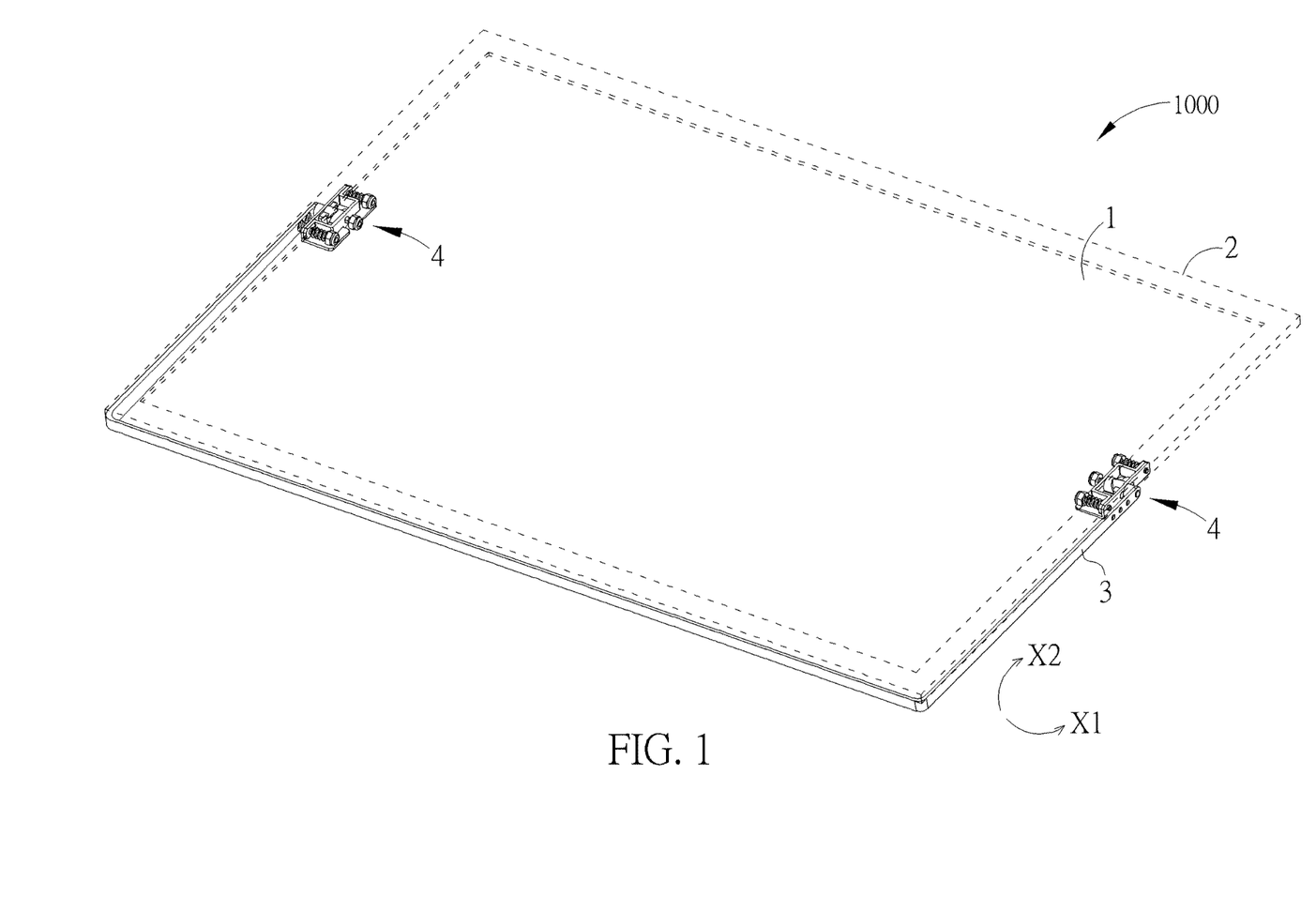
FIG. 1 and FIG. 2 are diagrams of an electronic device in different statuses according to an embodiment of the present invention.
Figure 2:
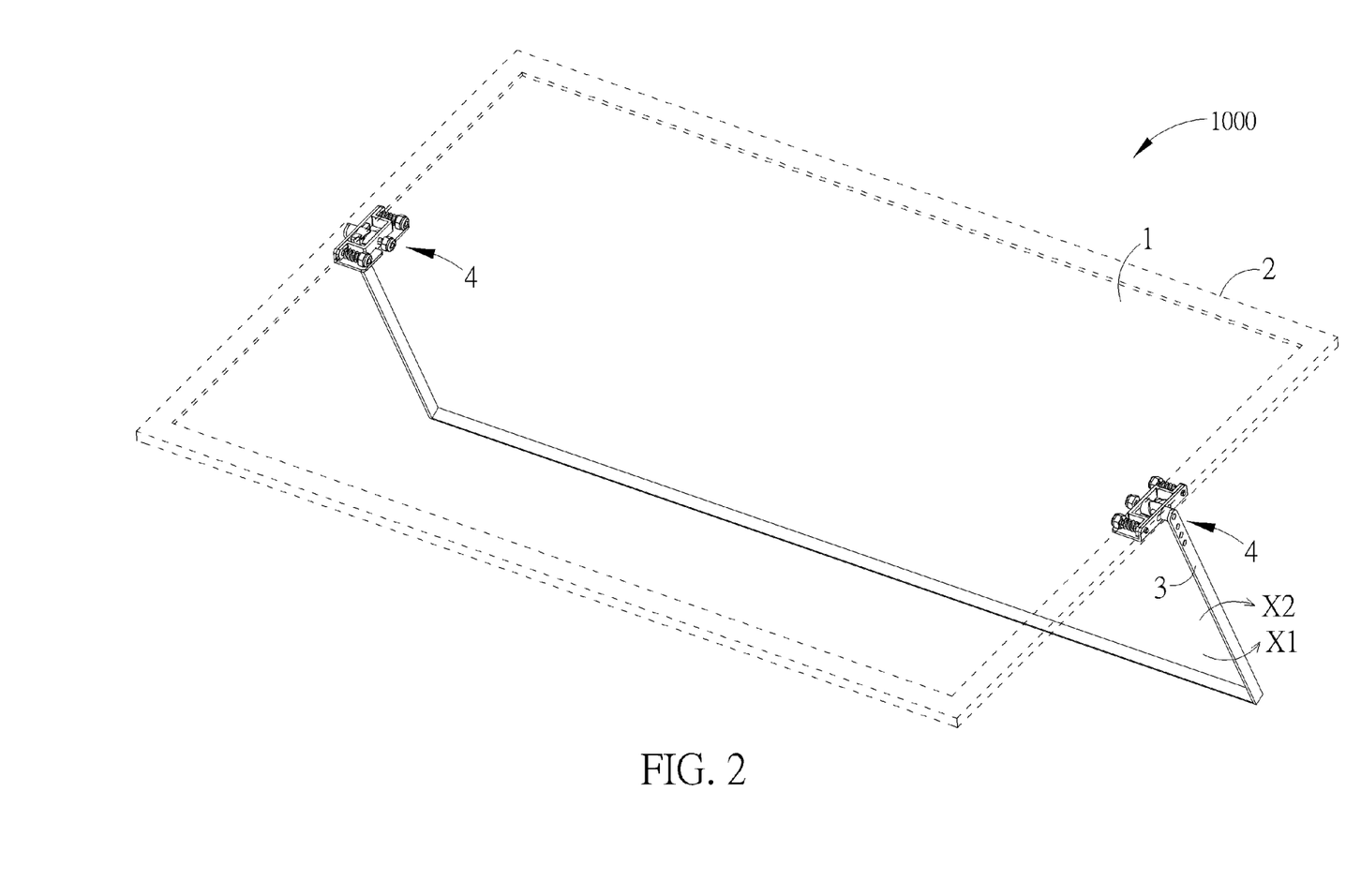

Please refer to FIG. 1 and FIG. 2. FIG. 1 and FIG. 2 are diagrams of an electronic device 1000 in different statuses according to an embodiment of the present invention. As shown in FIG. 1 and FIG. 2, the electronic device 1000 includes a display module 1, a casing 2, a stand 3 and a hinge mechanism 4. The display module 1 is used for displaying a touch control interface for allowing a user to perform a touch control operation. The casing 2 is used for holding the display module 1 and preventing inner components of the display module 1 from damage due to collision. The hinge mechanism 4 is used for pivoting the stand 3 to the casing 2, so that the stand 3 is pivoted to and rotatable relative to the casing 2. In this embodiment, the electronic device 1000 is a tablet computer, but the present invention is not limited thereto. The hinge mechanism 4 of the present invention can be adapted for casings with/without electronic components, such as a protecting cover of a cell phone or a cover of accessories.

Figure 3:
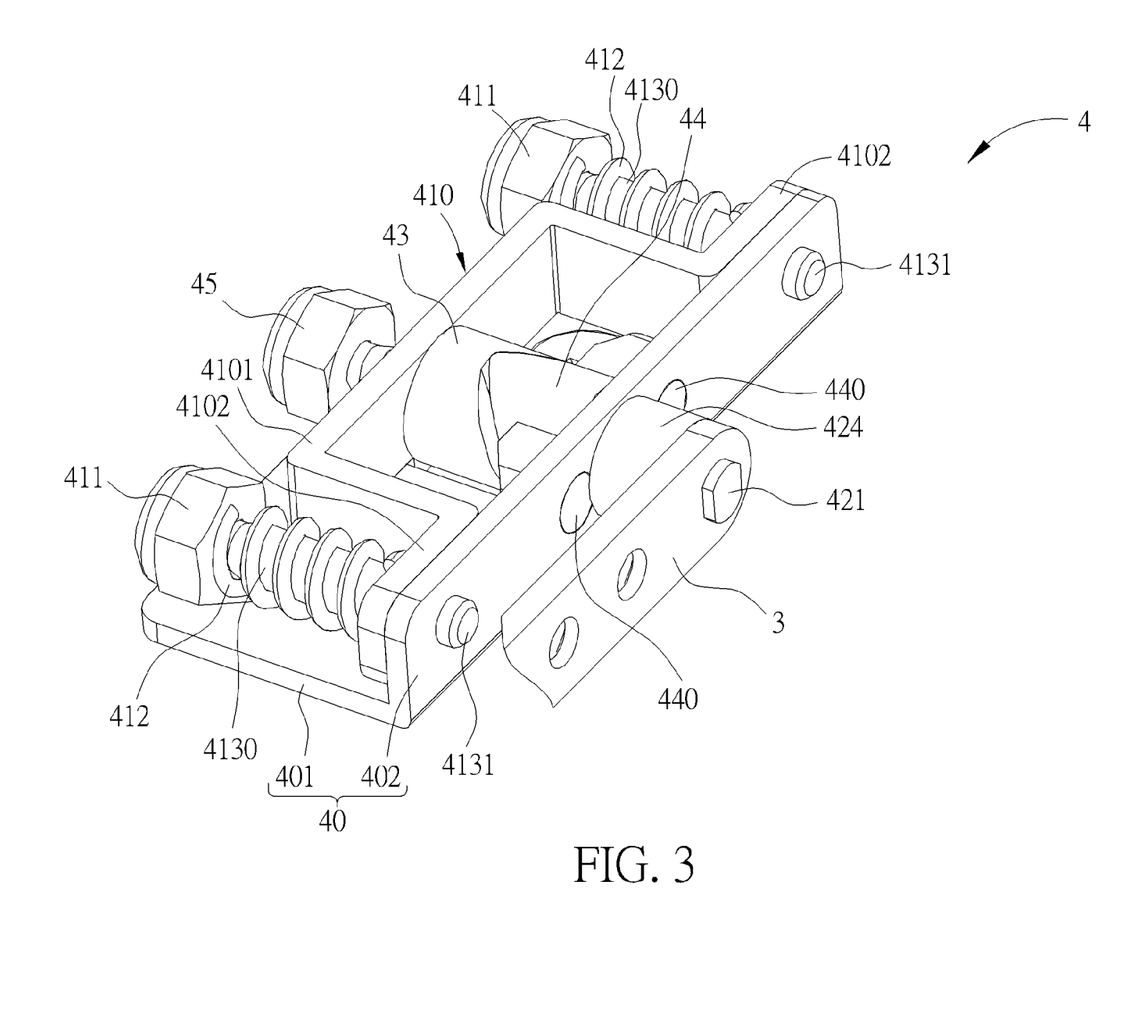
FIG. 3 is a diagram of a hinge mechanism according to the embodiment of the present invention.
Figure 4:
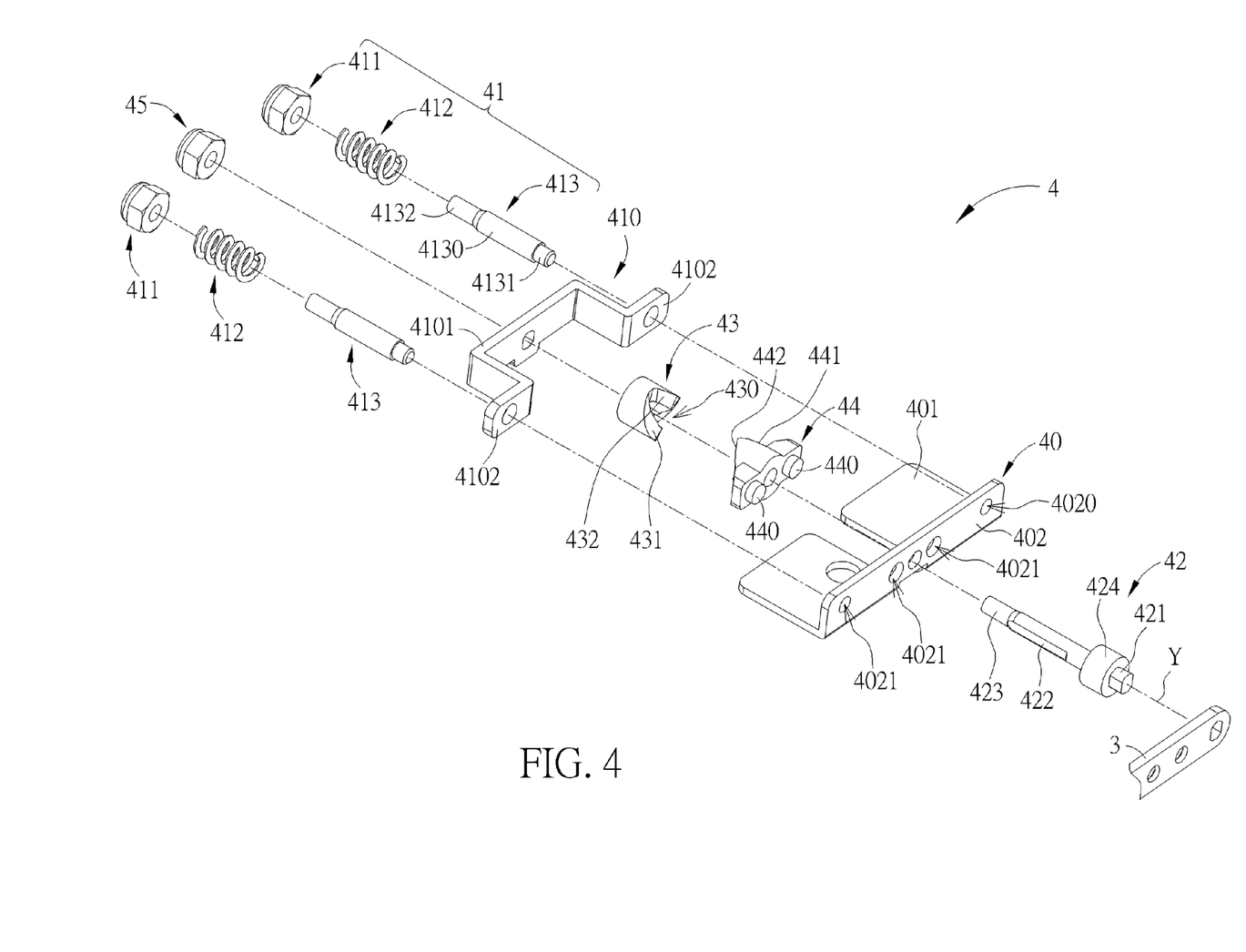
FIG. 4 and FIG. 5 are exploded diagrams of the hinge mechanism in different views according to the embodiment of the present invention.
Figure 5:
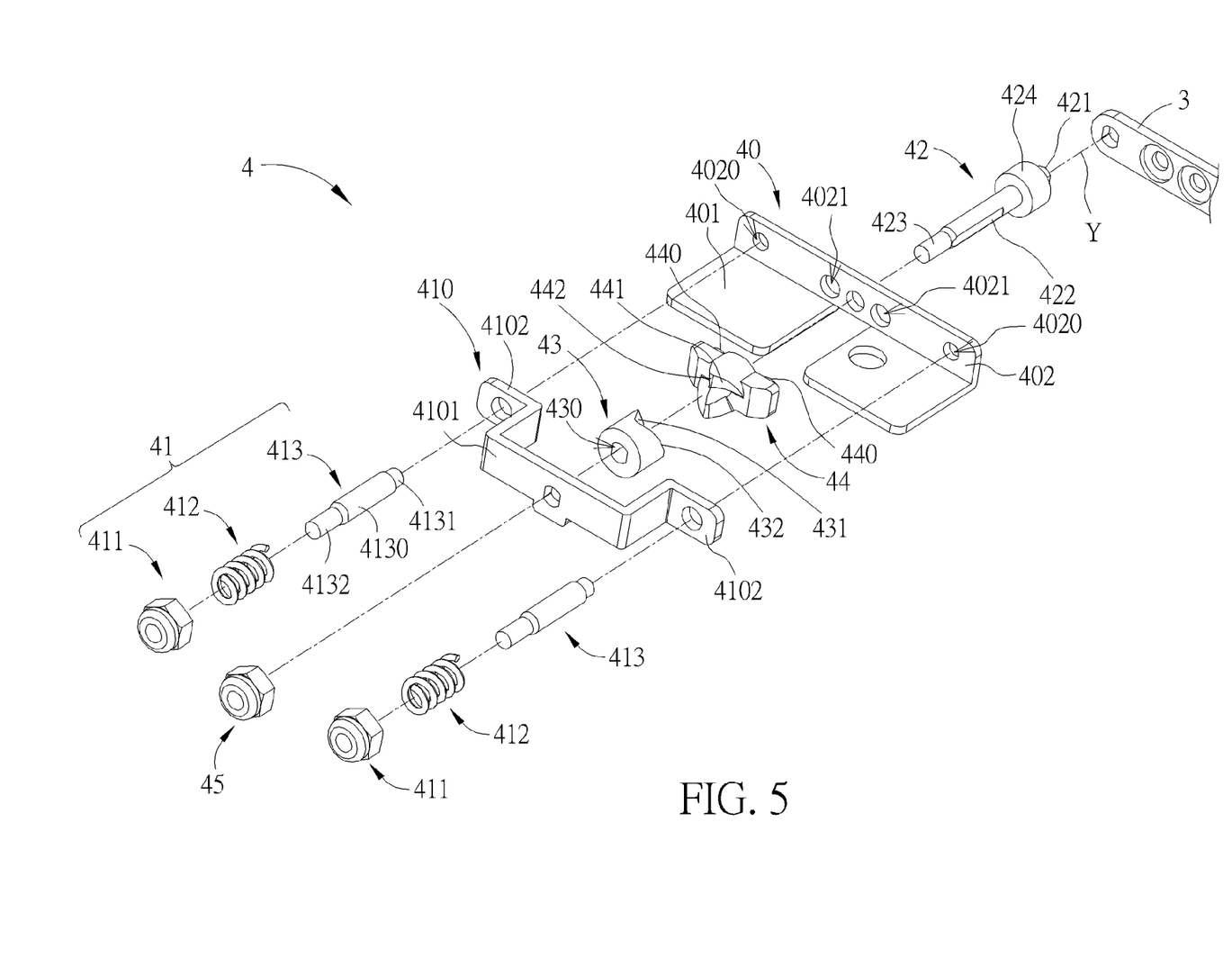

Please refer to FIG. 1 to FIG. 5. FIG. 3 is a diagram of the hinge mechanism 4 according to the embodiment of the present invention. FIG. 4 and FIG. 5 are exploded diagrams of the hinge mechanism 4 in different views according to the embodiment of the present invention. As shown in FIG. 1 to FIG. 5, the hinge mechanism 4 includes a base 40, a resilient mechanism 41, a rotating shaft 42, a first cam member 43 and a second cam member 44. The base 40 includes a base body 401 and a stopping wall 402. The base body 401 is screwed onto the casing 2, so that the base 40 is mounted on the casing 2. The stopping wall 402 protrudes from the base body 401. In practical application, the base 40 is made with iron material, and the base body 401 and the stopping wall 402 are integrally formed in a stamping manner, but the present invention is not limited thereto.

Furthermore, the resilient mechanism 41 is movably disposed on the base 40. In this embodiment, the resilient mechanism 41 includes a moving frame 410, two fixing members 411, two resilient members 412 and two assembly members 413. The moving frame 410 is movably disposed on the base 40 and includes a frame body 4101 and two lug portions 4102. The frame body 4101 abuts against the first cam member 43, so that the first cam member 43 abuts against the resilient mechanism 41. Each of the assembly members 413 has an assembly body 4130, a first fixing end 4131 and a second fixing end 4132. In practical application, the first fixing end 4131 has a threaded structure, and a corresponding screw hole 4020 is formed on the stopping wall 402 of the base 40. The threaded structure can be screwed with the screw hole 4020, so that the first fixing end 4131 is mounted on the stopping wall 402 of the base 40. In addition, the second fixing end 4132 has a threaded structure as well, and the fixing member 411 is a nut. The nut can be screwed with the second fixing end 4132. Accordingly, the fixing member 411 can be mounted with the second fixing end 4132, so that the fixing member 411 is installed on the base 40 by the assembly member 413.

In this embodiment, the two resilient members 412 are respectively a spring, and each of the springs corresponds to one of the fixing members 411. In other words, the spring (i.e., the resilient member 412) sheathes the assembly body 4130 of the assembly member 413. As shown in FIG. 3, the lug portion 4102 of the moving frame 410 protrudes from the frame body 4101 and abuts against one end of the resilient member 412, and the other end of the resilient member 412 abuts against the fixing member 411. Accordingly, the resilient member 412 is disposed between the fixing member 411 and the lug portion 4102 of the moving frame 410, so that the resilient member 412 provides the moving frame 410 with a resiliently recovery force when the resilient member 412 is compressed. It should be noticed that the two springs (i.e., the resilient members 412) are symmetric with each other and about the rotating shaft 42, i.e., distances between each of the springs and the rotating shaft 42 are identical. Accordingly, moments applied by each of the springs about the rotating shaft 42 can have identical magnitude and opposite directions, so that the moments applied by each of the springs about the rotating shaft 42 eliminate each other, which results in no rotation during movement of the moving frame 410 and further facilitates stability of the moving frame 410 during movement.

As shown in FIG. 1 to FIG. 5, the rotating shaft 42 is rotably disposed through the base 40. The rotating shaft 42 has a longitudinal axis Y, a connecting end 421 and an engaging portion 422. The longitudinal axis Y is substantially a central axis of the rotating shaft 42, and the connecting end 421 is connected to the stand 3. In practically application, the connecting end 421 is fixed with the stand 3 in a tight fit manner or in a screwed manner. Accordingly, when the stand 3 is rotated from a contained position shown in FIG. 1 to an expanded position shown in FIG. 2 in a first direction X1, the stand 3 is able to activate the rotating shaft 42, such that the rotating shaft 42 rotates relative to the base 40 of the hinge mechanism 4 along with the stand 3 in the first direction X1. Similarly, when the stand 3 is rotated from the expanded position shown in FIG. 2 to the contained position shown in FIG. 1 in a second direction X2 opposite to the first direction X1, the stand 3 activates the rotating shaft 42 as well, so that the rotating shaft 42 rotates relative to the base 40 of the hinge mechanism 4 with the stand 3 in the second direction X2. In addition, the first cam member 43 has a cooperating hole 430, and a shape of the cooperating hole 430 corresponds to a shape of the engaging portion 422 of the rotating shaft 42, and the cooperating hole 430 is used for engaging with the engaging portion 422. Accordingly, the first cam member 43 is able to engage with the engaging portion 422 of the rotating shaft 42, so that the first cam member 43 rotates with the rotating shaft 42 and the first cam member 43 slides along the longitudinal axis Y of the rotating shaft 42.

In this embodiment, the engaging portion 422 is a pillar with cutting planes, and the cooperating hole 430 is a through hole with fitting planes. When the pillar (i.e., the engaging portion 422) is disposed through the through hole (i.e., the cooperating hole 430), the cutting planes of the pillar abuts against the fitting planes of the through hole, so that the cooperating hole 430 engages with the engaging portion 422. In such a manner, the rotating shaft 42 is able to drive the first cam member 43 to rotate. Structures of the engaging portion 422 and the cooperating hole 430 are not limited to those illustrated in figures in this embodiment, i.e., structures that the engaging portion 422 is a pillar with non-circular shapes and the cooperating hole 430 is a through hole with shape corresponding to the pillar is within the scope of the present invention.

In addition, there are two engaging holes 4021 formed on the stopping wall 402 of the base 40, and the second cam member 44 has two engaging posts 440. The engaging posts 440 engage with the engaging holes 4021, respectively. Accordingly, the second cam member 44 is mounted on the base 40. In other words, when the first cam member 43 rotates with the rotating shaft 42, the second cam member 44 does not rotate with the first cam member 43 since the second cam member 44 is mounted with the base 40, i.e., the first cam member 43 rotates relative to the second cam member 44 when the rotating shaft 42 is activated by the stand 3. In such a manner, a cam surface of the first cam member 43 displaces relative to a cam surface of the second cam member 44. Configurations and amounts of the engaging post 440 and the engaging hole 4021 are not limited to those illustrate in figures in this embodiment. For example, there can be only one engaging hole 4021 formed on the stopping wall 402, and the second cam member 44 can have only one engaging post 440, i.e., structures that there is at least one engaging hole 4021 formed on the stopping wall 402 and the second cam member 44 has at least one engaging post 440 are within the scope of the present invention.

It should be noticed that amounts of the fixing members 411, the resilient member 412 and the lug portion 4102 are corresponding to one another and not limited to those illustrated in figures in this embodiment. For example, the resilient mechanism 41 can include only one fixing members 411, one resilient members 412 and one assembly members 413, and the moving frame 410 can correspondingly include only one lug portions 4102. In other words, structures that the resilient mechanism 41 include at least one fixing members 411, at least one resilient members 412 and at least one assembly members 413, and the moving frame 410 include at least one lug portions 4102 are within the scope of the present invention.

In addition, the rotating shaft 42 further has a secure end 423 and a stopping portion 424. The secure end 423 is opposite to the connecting end 421, and the stopping portion 424 abuts against the stopping wall 402 of the base 40. In this embodiment, the stopping portion 424 is a flange, but the present invention is not limited thereto. The hinge mechanism 4 can further include a constraining member 45. In this embodiment, the secure end 423 can have a threaded structure, and the constraining member 45 can be a nut. The nut (i.e., the constraining member 45) is screwed with the threaded structure, so that the constraining member 45 is mounted with the secure end 423. Accordingly, the constraining member 45 is able to stop the frame body 4101 of the moving frame 410, so as to prevent the moving frame 410 from separating from the rotating shaft 42. It should be noticed that the fixing member 411 is able to prevent the moving frame 410 from separating from the base 40 as well when the moving frame 410 is installed on the base 40 by utilizing the assembly members 413 and the fixing members 411 of the resilient mechanism 41. As a result, the constraining member 45 of the present invention can be omitted.

Figure 6:
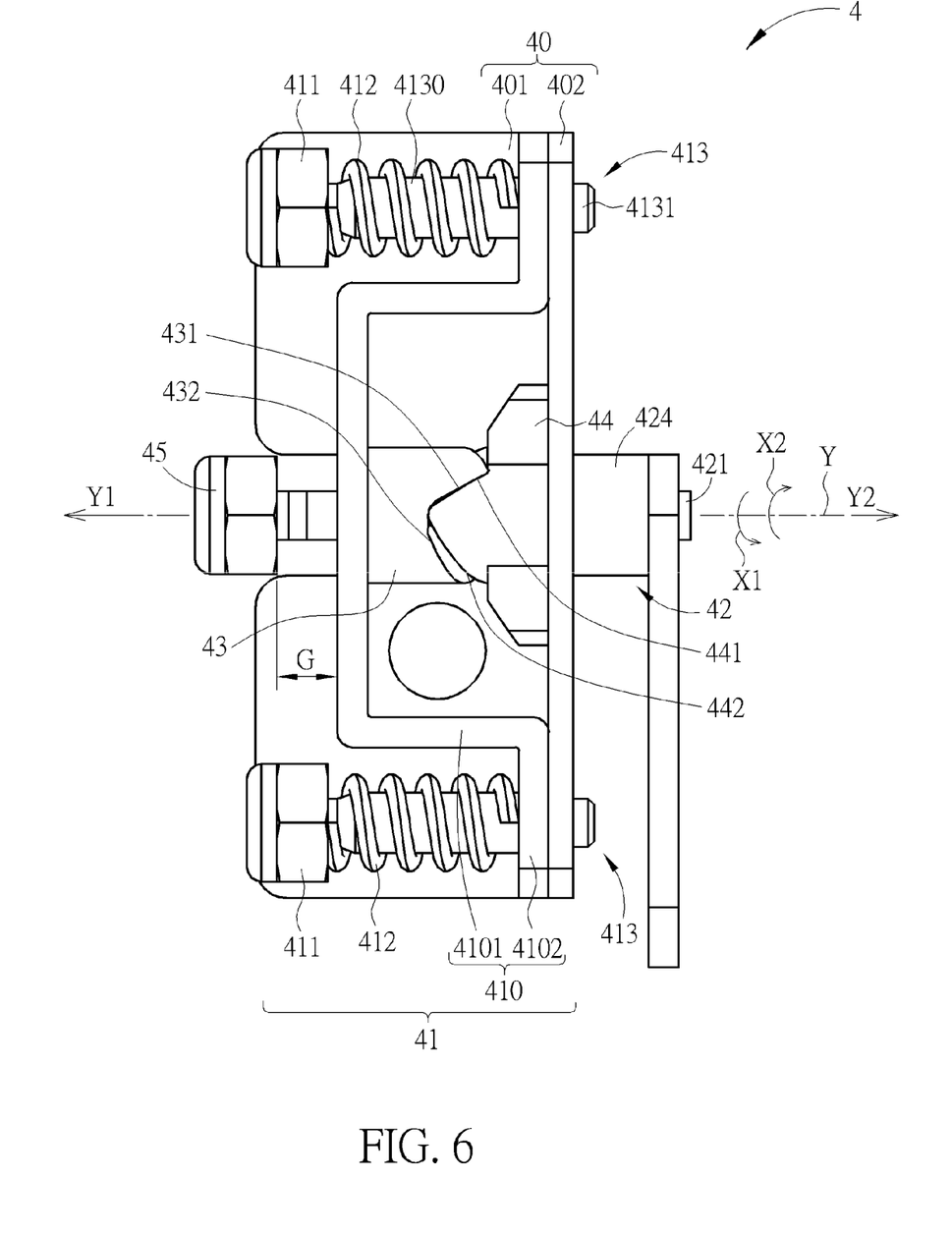
FIG. 6 is a top view of the hinge mechanism according to the embodiment of the present invention.

Please refer to FIG. 3 to FIG. 6. FIG. 6 is a top view of the hinge mechanism 4 according to the embodiment of the present invention. As shown in FIG. 3 to FIG. 6, the constraining member 45 is spaced from the frame body 4101 of the moving frame 410 by a gap G, and the gap G is able to provide a space for allowing the moving frame 410 to move relative to the base 40. The first cam member 43 has two first cam surfaces 431, 432, and the second cam member 44 has two second cam surfaces 441, 442. The first cam surfaces 431, 432 correspond to the second cam surfaces 441, 442, so that the second cam member 44 is cam-cooperated with the first cam member 43.

As shown in FIG. 1, FIG. 2 and FIG. 6, when the rotating shaft 42 rotates with the stand 3 from the contained position shown in FIG. 1 to the expanded position shown in FIG. 2 in the first direction X1, the rotating shaft 42 activates the first cam member 43 to rotate in the first direction X1. When the first cam member 43 rotates with the rotating shaft 42 in the first direction X1, the first cam surface 431 slides relative to the second cam surface 441. Since the second cam member 44 is fixed on the base 40, the first cam member 43 is pushed by the second cam member 44 when the first cam surface 431 slides relative to the second cam surface 441, so that the first cam member 43 moves relative to the second cam member 44 in a compression direction Y1 of the longitudinal axis Y. Accordingly, the first cam member 43 activates the moving frame 410 along the compression direction Y1 by a displacement. In the meanwhile, the lug portion 4102 of the moving frame 410 compresses the resilient member 412 cooperatively with the fixing members 411, so that the resilient member 412 is compressed to generate the resiliently recovery force.

When the electronic device 1000 is desired to be contained, the electronic device 1000 is taken from a fixing surface, such as a desktop, first. In the meanwhile, the resiliently recovery force generated by the resilient member 412 drives the moving frame 410 to recover along a recovery direction Y2 of the longitudinal axis Y. In the meanwhile, the moving frame 410 presses the first cam member 43, so as to force the first cam surface 431 of the first cam member 43 to slide relative to the second cam surface 441 of the second cam member 44. During the first cam surface 431 slides relative to the second cam surface 441, the first cam member 43 rotates about the longitudinal axis Y and in the second direction X2. Accordingly, the first cam member 43 activates the stand 3 to rotate from the expanded position shown in FIG. 2 to the contained position shown in FIG. 1 in the second direction X2. In such a manner, the resiliently recovery force generated by the resilient mechanism 41 of the hinge mechanism 4 is able to retract the stand 3 to the casing 2 and it does not require the user to manually retract the stand 3, so as to enhance convenience of the electronic device 1000 in use.

It should be noticed that the first cam member 43 of the present invention has two first cam surfaces 431, 432, and the second cam member 44 has two second cam surfaces 441, 442. The first cam surfaces 431, 432 are corresponding to the second cam surfaces 441, 442. As a result, structures that the first cam surface 431, 432 are corresponding to the second cam surfaces 441, 442 are able to provide the resilient member 412 with different compressions during the moving frame 410 rotates relative to the casing 2. Amounts of the first cam surface and the second cam surface are not limited to those illustrated in figures in this embodiment, and it depends on practical demands.

Figure 7:
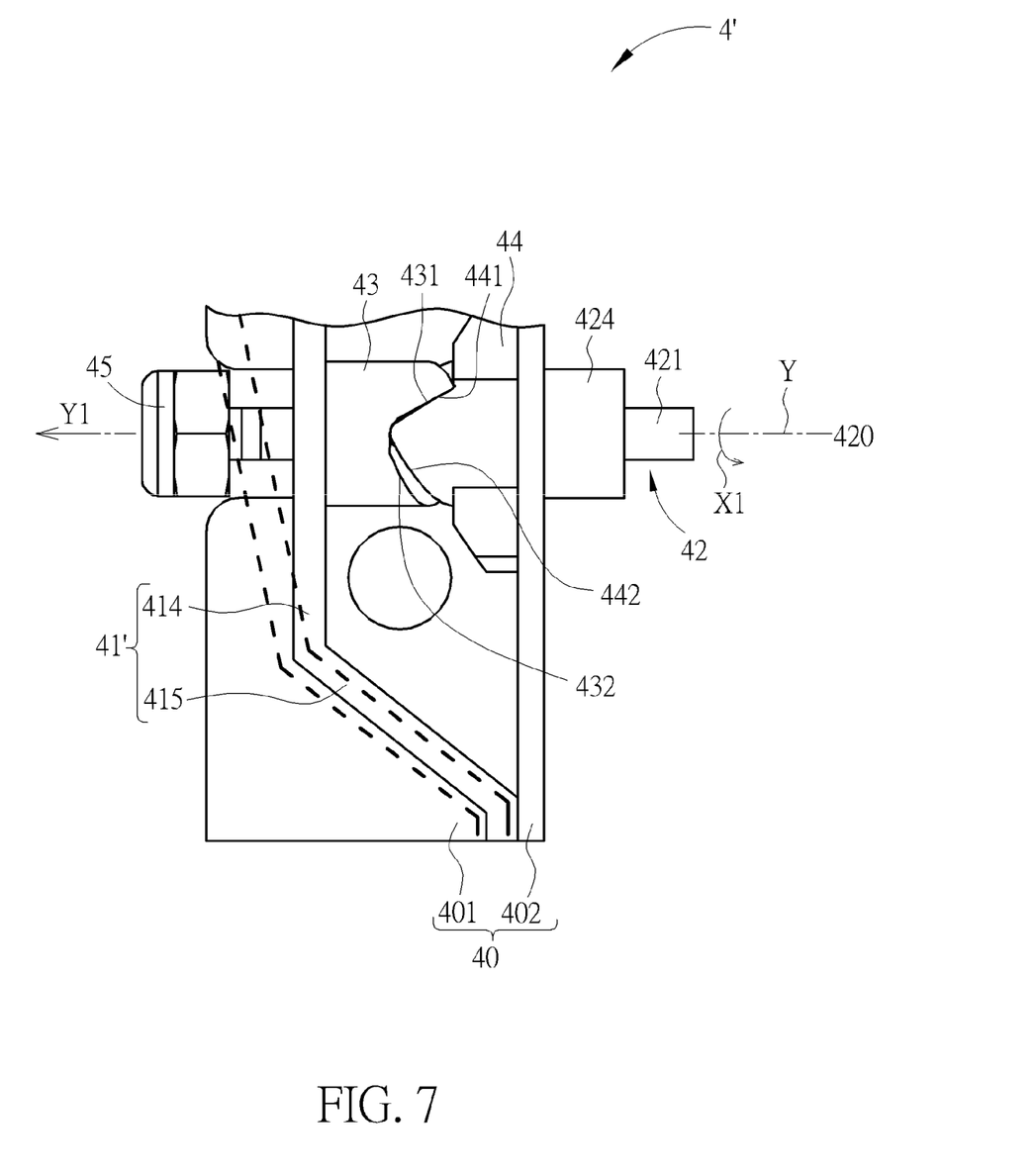
FIG. 7 is a partly diagram of a hinge mechanism according to another embodiment of the present invention.

Please refer to FIG. 7. FIG. 7 is a partly diagram of a resilient mechanism 41' according to another embodiment of the present invention. As shown in FIG. 7, the main difference between the hinge mechanism 4 and the aforesaid hinge mechanism 4 is that a resilient mechanism 41' of the hinge mechanism 4' is a resilient frame, and the resilient frame (i.e., the hinge mechanism 4') includes a flexibly abutting portion 414 and a spring arm 415. The flexibly abutting portion 414 abuts against the first cam member 43, and the spring arm 415 extends from the flexibly abutting portion 414 and is connected to the base 40. When the rotating shaft 42 rotates in the first direction X1, the rotating shaft 42 activates the first cam member 43 to rotate relative to the second cam member 44 in the first direction X1. In the meanwhile, the first cam surface 431 of the first cam member 43 slides relative to the second cam surface 441 of the second cam member 44, so that the first cam member 43 displaces relative to the second cam member 44 in the compression direction Y1 of the longitudinal axis Y. In other words, when the first cam member 43 displaces relative to the second cam member 44 along the longitudinal axis Y, the first cam member 43 forces the flexibly abutting portion 414 and the spring arm 415 of the resilient mechanism 41' to deform from a position illustrated in solid line to a position illustrated in dotted line, as shown in FIG. 7. In such a manner, the first cam member 43 is able to force the flexibly abutting portion 414 and the spring arm 415 of the resilient mechanism 41' to generate a recovery force. Components with denoted in this embodiment identical to those in the aforesaid embodiment have identical structures and functions, and further description is omitted herein for simplicity.

Compared to the prior art, the present invention utilizes the first cam member to cooperate with the second cam member when the first cam member rotates with the rotating shaft, so that the first cam member displaces relative to the second cam member for forcing the resilient mechanism to generate a resiliently recovery force. The resiliently recovery force recovers the first cam member and the second cam member. Accordingly, when the electronic device is desired to be contained, the resiliently recovery force generated by the resilient mechanism is able to retract the stand to the casing, and it does not require the user to manually retract the stand to the casing, so as to enhance convenience of the electronic device in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hinge mechanism for pivoting a casing with a stand, comprising:
   a base mounted on the casing;
   a resilient mechanism movably disposed on the base, the resilient mechanism comprising:
   a moving frame movably disposed on the base;
   at least one fixing member installed on the base;
   at least one resilient member abutting against the at least one fixing member and the moving frame; and
   at least one assembly member having an assembly body, a first fixing end and a second fixing end, the first fixing end being mounted on the base, the at least one fixing member being mounted with the second fixing end, the at least one resilient member sheathing the assembly body;
   a rotating shaft rotably disposed through the base, the rotating shaft having a longitudinal axis, a connecting end and an engaging portion, the connecting end being connected to the stand, so that the rotating shaft rotates relative to the base along with the stand;
   a first cam member abutting against the resilient mechanism and being slidable along the longitudinal axis, the first cam member engaging with the engaging portion, so that the first cam member rotates with the rotating shaft; and
   a second cam member mounted on the base and cam-cooperated with the first cam member, the first cam member cooperating with the second cam member when the first cam member rotates with the rotating shaft, so that the first cam member displaces along the longitudinal axis relative to the second cam member for deforming the resilient mechanism;
   wherein the first cam member drives the moving frame to move in a compression direction when the first cam member displaces along the longitudinal axis relative to the second cam member, so that the moving frame compresses the at least one resilient member cooperatively with the at least one fixing member.

2. The hinge mechanism of claim 1, wherein an amount of the at least one fixing member is two, an amount of the at least one resilient member is two, the two resilient members are respectively a spring, and each of the two springs corresponds to one of the fixing members.

3. The hinge mechanism of claim 2, wherein the two springs are symmetric with each other and about the rotating shaft.

4. The hinge mechanism of claim 1, wherein the rotating shaft further has a secure end opposite to the connecting end, and the moving frame comprises:
   a frame body abutting against the first cam member;
   at least one lug portion protruding from the frame body and abutting against an end of the at least one resilient member; and
   a constraining member mounted with the secure end, the constraining member being spaced from the frame body of the moving frame.

5. The hinge mechanism of claim 1, wherein at least one engaging hole is formed on the base, the second cam member has at least one engaging post, and the at least one engaging post engages with the at least one engaging hole.

6. The hinge mechanism of claim 1, wherein the resilient mechanism is a resilient frame, and the resilient frame comprises:
- a flexibly abutting portion abutting against the first cam member; and
- a spring arm portion extending from the flexibly abutting portion and being connected to the base, the first cam member forces the flexibly abutting portion and the spring arm portion to deform when the first cam member displaces relative to the second cam member along the longitudinal axis.

7. The hinge mechanism of claim 1, wherein the first cam member has at least one first cam surface, the second cam member has at least one second cam surface, the at least one second cam surface corresponds to the at least one first cam surface, and the at least one first cam surface slides relative to the at least one second cam surface when the first cam member rotates with the rotating shaft, so that the first cam member moves along the longitudinal axis relative to the second cam member.

8. The hinge mechanism of claim 1, wherein the first cam member has a cooperating hole, and the cooperating hole engages with the engaging portion.

\* \* \* \* \*